(12) United States Patent
Kapartis

(10) Patent No.: US 10,837,853 B2
(45) Date of Patent: Nov. 17, 2020

(54) SENSOR

(71) Applicant: FT Technologies (UK) Ltd, Sunbury-on-Thames (GB)

(72) Inventor: Savvas Kapartis, London (GB)

(73) Assignee: FT TECHNOLOGIES (UK) LTD, Sunbury-On-Thames (GB)

( * ) Notice: Subject to any disclaimer, the term of this patent is extended or adjusted under 35 U.S.C. 154(b) by 149 days.

(21) Appl. No.: 16/077,717

(22) PCT Filed: Dec. 20, 2016

(86) PCT No.: PCT/GB2016/054002
§ 371 (c)(1),
(2) Date: Aug. 13, 2018

(87) PCT Pub. No.: WO2017/141002
PCT Pub. Date: Aug. 24, 2017

(65) Prior Publication Data
US 2019/0056281 A1 Feb. 21, 2019

(30) Foreign Application Priority Data
Feb. 15, 2016 (GB) .................................. 1602670.0

(51) Int. Cl.
*G01L 19/04* (2006.01)
*G01L 11/04* (2006.01)
(Continued)

(52) U.S. Cl.
CPC .......... *G01L 19/0092* (2013.01); *G01K 11/26* (2013.01); *G01L 11/04* (2013.01)

(58) Field of Classification Search
CPC ....... G01L 9/0022; G01L 9/008; G01L 11/04; G01L 9/0025; G01L 21/22; G01L 9/0008;
(Continued)

(56) References Cited

U.S. PATENT DOCUMENTS 3,621,453 A 11/1971 Ringwall
4,233,843 A 11/1980 Thompson et al.
(Continued)

FOREIGN PATENT DOCUMENTS

CN 101646937 2/2010
EP 0801311 10/1997
(Continued)

OTHER PUBLICATIONS

Great Britain Patent Application No. GB1602670.0, Combined Search and Examination Report dated Jul. 14, 2016.
(Continued)

*Primary Examiner* — Andre J Allen
(74) *Attorney, Agent, or Firm* — Sheppard, Mullin, Richter & Hampton LLP

(57) ABSTRACT

A sensor (2) is provided, having an acoustic resonator (18) for containing a fluid such as air and at least one transducer (22, 24) arranged to emit an acoustic signal into the acoustic resonator (18) in response to an excitation signal provided to the transducer (22, 24) by an electronic unit (4). The electronic unit (4) receives a response signal from at least one transducer (22, 24), and processes the excitation signal and the response signal to derive the acoustic signal response of the acoustic resonator. The pressure and/or temperature of the fluid may be derived from the acoustic signal response. More specifically, the electronic unit (4) may derive the temperature of fluid inside the acoustic resonator (18) by obtaining the resonant frequencies of the acoustic signal inside the acoustic resonator (18), or may derive the barometric pressure from the acoustic signal response in the vicinity of the fundamental frequency and its harmonics.

10 Claims, 1 Drawing Sheet

(51) Int. Cl.
*G01L 19/00* (2006.01)
*G01K 11/26* (2006.01)

(58) Field of Classification Search
CPC . G01L 9/0019; G01L 19/0092; G01L 9/0016; G01L 19/0609; G01L 19/0681; G01L 1/165; G01L 19/0645; G01L 9/002; G01L 9/0052; G01L 9/08; G01L 11/06; G01L 13/00; G01L 19/0038; G01L 19/04; G01L 19/0627; G01L 19/143; G01L 23/24; G01L 3/10; G01L 9/001; G01L 9/0013; G01L 9/0041; G01L 9/0042; G01L 9/0045; G01L 9/0048; G01L 9/0054; G01L 9/006; G01L 9/06; G01L 11/02; G01L 13/02; G01L 13/025; G01L 17/00; G01L 19/0007; G01L 19/0023; G01L 19/0046; G01L 19/086; G01L 19/141; G01L 19/147; G01L 1/162; G01L 1/18; G01L 1/255; G01L 21/10; G01L 23/08; G01L 23/10; G01L 23/18; G01L 23/221; G01L 23/26; G01L 23/28; G01L 27/002; G01L 27/007; G01L 5/225; G01L 7/08; G01L 7/084; G01L 7/18; G01L 9/0001; G01L 9/0017; G01L 9/0033; G01L 9/0047; G01L 9/0072; G01L 9/0075; G01L 9/0091; G01L 9/0098; G01L 9/065; G01L 9/085; G01L 9/125; G01K 11/265; G01K 7/32

See application file for complete search history.

(56) References Cited

U.S. PATENT DOCUMENTS

| | | | |
|---|---|---|---|
| 4,265,125 A | | 5/1981 | Mahany |
| 4,869,097 A | | 9/1989 | Tittmann et al. |
| 5,587,620 A | * | 12/1996 | Ruby ............ H03H 3/04 310/312 |
| 5,768,937 A | * | 6/1998 | Wajid ............ G01F 1/662 73/23.2 |
| 5,877,416 A | * | 3/1999 | Kapartis ........ G01F 1/662 73/170.08 |
| 5,987,992 A | * | 11/1999 | Watanabe ...... G10K 9/22 310/315 |
| 10,145,558 B2 | * | 12/2018 | Schuermans ... G01K 13/02 |
| 2005/0066744 A1 | * | 3/2005 | Kupnik .......... G01F 1/662 73/861.03 |
| 2006/0203877 A1 | * | 9/2006 | Heyman ......... G01K 11/22 374/117 |
| 2019/0107420 A1 | * | 4/2019 | Kincel ........... G01N 29/032 |

FOREIGN PATENT DOCUMENTS

| | | |
|---|---|---|
| EP | 2853871 | 4/2015 |
| GB | 931233 | 7/1963 |

OTHER PUBLICATIONS

International Application No. PCT/GB2016/054002, International Search Report and Written Opinion dated Feb. 6, 2017.

\* cited by examiner

SENSOR

CROSS-REFERENCE TO RELATED APPLICATIONS

This application is a national stage application pursuant to 35 U.S.C. § 371 of International Application No. PCT/GB2016/054002 filed Dec. 20, 2016, which claims priority to United Kingdom Patent Application No. 1602670.0 filed Feb. 15, 2016, the disclosures of which are hereby incorporated by reference herein.

FIELD OF THE DISCLOSURE

This disclosure relates to a sensor for measuring barometric pressure, or more generally pressure and/or temperature of fluids.

BACKGROUND TO THE DISCLOSURE

Thermometers that measure temperature of a gas by sensing transit time of an acoustic signal in the gas are known. Such thermometers are able to respond quickly and accurately to temperature changes in the gas because their sensing element comprises the gas itself. Moreover, such thermometers measure the average temperature of the volume of gas in the path of the acoustic signal, unlike other thermometer types that measure temperature in a more localised area or volume.

The present invention seeks to provide a novel sensor for measuring barometric pressure and/or the temperature of air and other fluids.

SUMMARY OF THE DISCLOSURE

According to a first aspect of the disclosure, there is provided a sensor, comprising a resonator unit, the resonator unit comprising an acoustic resonator for containing a fluid, the acoustic resonator being operable to support standing acoustic waves, the resonator unit being operable to convert an electrical excitation signal into an acoustic signal in the acoustic resonator to establish the standing acoustic waves and operable to convert the acoustic signal in the acoustic resonator into an electrical response signal, and an electronic unit coupled to the resonator unit, the electronic unit being operable to provide the electrical excitation signal to the resonator unit and to receive the electrical response signal from the resonator unit, to process the electrical excitation signal and the electrical response signal to determine an acoustic signal response, and to derive one or more of the pressure and the temperature of the fluid in the acoustic resonator from the acoustic signal response.

According to a second aspect of the disclosure there is provided a method of measuring temperature and/or pressure of a fluid, comprising applying an electrical excitation signal to at least one transducer operable to convert the electrical excitation signal into an acoustic signal in an acoustic resonator for containing a fluid, to establish standing acoustic waves in the acoustic resonator, receiving an electrical response signal from at least one transducer operable to convert the acoustic signal in the acoustic resonator into an electrical response signal, processing the electrical excitation signal and the electrical response signal to determine an acoustic signal response, and determining one or more of the pressure and the temperature of the fluid in the acoustic resonator from the acoustic signal response.

According to a third aspect of the disclosure, there is provided a sensor, comprising a resonator unit, the resonator unit comprising an acoustic resonator for containing a fluid, the acoustic resonator being operable to support standing acoustic waves, the resonator unit being operable to convert an electrical excitation signal into an acoustic signal in the acoustic resonator to establish the standing acoustic waves and operable to convert the acoustic signal in the acoustic resonator into an electrical response signal, and an electronic unit coupled to provide the electrical excitation signal to the resonator unit and to receive the electrical response signal from the resonator unit, the electronic unit comprising a processor and a memory containing instructions executable by the processor to carry out the claimed method.

Embodiments of the disclosure provide a sensor that can be fabricated in a compact, robust, cost effective and easy to use form suitable for a wide range of applications.

Embodiments of the disclosure may possess one or more of the following properties: operable at very high and very low temperature; fast, sensitive and accurate; requiring little or no periodic maintenance; dissipating minimal power; causing a negligible disturbance to the fluid being measured; and operating under extreme environmental conditions.

Embodiments of the present disclosure can be integrated in the acoustic resonance fluid flow meter described in European patent publication EP 0801311 B1 with only minimal increase in complexity and with minimal extra cost.

Specific embodiments are described below, by way of example only, with reference to the accompanying drawings.

DETAILED DESCRIPTION OF PREFERRED EMBODIMENTS

Figures 1, 2:
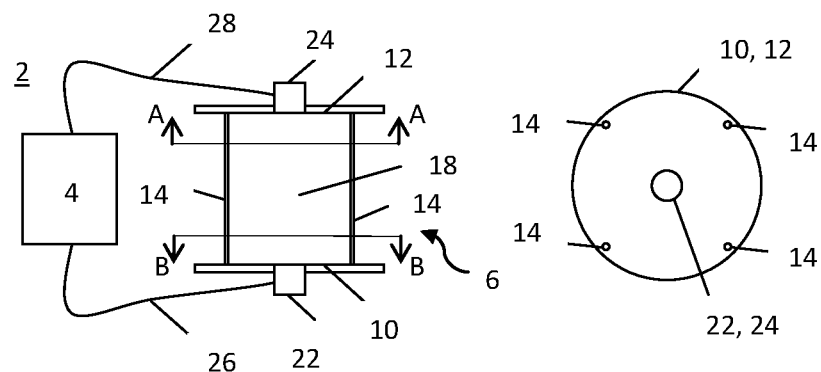
FIG. 1 is a diagrammatic cross-sectional view of a sensor of one embodiment of this disclosure.
FIG. 2 is a diagrammatic view at section AA or section BB of the sensor shown in FIG. 1.
Figures 3, 4:
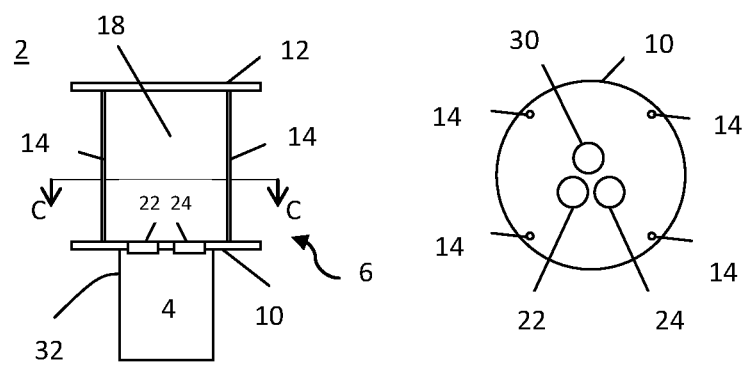
FIG. 3 is a diagrammatic cross-sectional view of a sensor of a second embodiment of this disclosure.
FIG. 4 is a diagrammatic view at section CC of the sensor shown in FIG. 3.

Referring to FIGS. 1 to 5, a sensor 2 for measuring pressure and/or temperature of a fluid comprises an electronic unit 4 and a resonator unit 6. In this embodiment, the fluid is air. However, the sensor can operate with other fluids, and the disclosure extends to sensors for measuring pressure and/or temperature of fluids in general.

The electronic unit 4 is coupled to the resonator unit 6 and arranged to cause the resonator unit 6 to generate an acoustic signal over a range of frequencies. The electronic unit 4 is also arranged to use an acoustic signal response of the resonator unit 6 to derive the barometric pressure and/or temperature of air in the resonator unit 6. In this embodiment, the electronic unit 4 incorporates a processor and a memory (not shown) containing instructions causing the processor to implement the method described below.

The resonator unit 6 is provided with a first reflector 10 and a second reflector 12. The reflectors 10, 12 are circular plates arranged in parallel with each other, and are spaced at a distance from each other by a plurality of spacers 14 located at intervals around the perimeter of the reflectors 10, 12. Four spacers 14 are shown in the disclosed embodiments. In this embodiment, the reflectors 10, 12 are also coaxial with each other, so as to be positioned at the ends of an imaginary cylinder. Other shapes of reflectors 10, 12 may be provided, and the reflectors 10, 12 may be spaced apart in different ways, for example by an external supporting structure or by being attached to opposite sides of a vessel or duct containing the air. The size of the reflectors 10, 12 is not critical beyond some minimum size required to establish acoustic standing waves, as will be explained below, and so a compact design of the sensor 2 is readily achievable.

An acoustic resonator 18 is defined between the reflectors 10, 12. The acoustic resonator 18 is bounded in a primary direction by reflectors 10, 12, and the acoustic resonator 18 is not bounded in secondary directions parallel to reflectors 10, 12, and perpendicular to the primary direction. In the secondary directions, the acoustic resonator 18 is generally open, and the extent of the acoustic resonator 18 is effectively defined by the outer perimeter or edge of the reflectors 10, 12, although the acoustic signal is not constraint within the confines of the acoustic resonator 18. In FIG. 1, the primary direction is vertical and secondary directions are horizontal.

The acoustic resonator 18 is open to airflow in secondary directions and is occupied by air that is free to flow through the acoustic resonator 18 in any secondary direction.

The resonator unit 6 is provided with two transducers 22, 24. The transducers 22, 24 are electro-acoustic transducers that emit an acoustic signal in response to a received electrical signal and/or output an electrical signal in response to a received acoustic signal. The transducers 22, 24 can be of any known type such as piezoelectric, inductive, or electrostatic transducers. The transduction from electrical to acoustic signal and vice versa performed by the transducers is substantially linear and the signals are analogue in nature.

At least one of the transducers 22, 24 operates as an excitation transducer. In this embodiment, transducer 22 mounted on the first reflector 10 is arranged to operate as an excitation transducer and is coupled to the electronic unit 4 by means of a connecting lead 26. The transducer 22 operating as an excitation transducer is arranged to emit an acoustic signal into the acoustic resonator 18 in response to an electrical excitation signal received from the electronic unit 4. The spectral content of the emitted acoustic signal is substantially the same as the spectral content of the electrical excitation signal.

At least one of the transducers 22, 24 operates as a response transducer. In this embodiment, transducer 24 mounted on the second reflector 12 is arranged to operate as a response transducer and is coupled to the electronic unit 4 by means of a connecting lead 28. The transducer 24 operating as a response transducer is arranged to output an electrical response signal to the electronic unit 4 in response to reception of the acoustic signal present in the acoustic resonator 18. The spectral content of the electrical response signal is substantially the same as the spectral content of the received acoustic signal.

Embodiments extend to sensors having one or several transducers 22, 24, which may be mounted on one or other reflector 10, 12 or shared between the reflectors 10, 12 in any formation, allowing considerable flexibility in the design of the sensor 2. In one embodiment, shown in FIGS. 3 and 4, a third transducer 30 is provided in addition to the two transducers 22, 24 described above, and all three transducers 22, 24, 30 are mounted on the first reflector 10 so that the electronic unit 4 may be mounted directly below the reflector 10, and the connecting leads 26 and 28 (not shown in FIG. 3) may be completely enclosed in an enclosure 32 containing the electronic unit 4. This arrangement provides a compact, robust, self-contained instrument.

During operation of the sensor 2, the electronic unit 4 provides an excitation signal to the transducer 22 operating as an excitation transducer and receives a response signal from at least the transducer 24 operating as a response transducer. The electronic unit 4 determines an acoustic signal response of the acoustic resonator 18 from the electrical excitation signal and the electrical response signal over a range of frequencies, applied simultaneously or in sequence.

The acoustic signal emitted within the acoustic resonator 18 by the transducer 22 operating as an excitation transducer undergoes several successive reflections at the reflectors 10, 12 and depending on the relationship between the separation of the reflectors 10, 12, and the wavelength of the acoustic signal, exhibits constructive or destructive superposition of the successive reflections.

At some frequencies, the successive reflections of the acoustic signal superimpose constructively, leading to reinforcement of the acoustic signal and the establishment of a resonance condition in which standing acoustic waves are formed in the primary direction of the acoustic resonator 18.

The superposition of several successive reflections means that the effective propagation path of the acoustic signal in the resonance condition is considerably longer than the gap between the reflectors 10, 12. This path magnification happens at a fundamental frequency and its harmonics and provides a sensitive mechanism for measuring the propagation characteristics of sound through air over a broad range of frequencies, which would otherwise be hard to obtain in a compact instrument.

Standing acoustic waves occur in the primary direction of the acoustic resonator 18 and not in secondary directions that lack reflectors. The frequencies at which the resonance condition is established therefore depend on the separation between the reflectors 10, 12 and not on any other dimension of the acoustic resonator 18.

Figure 5:
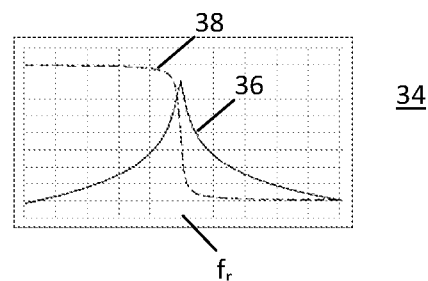
FIG. 5 is a diagram showing an exemplary frequency domain signal response of an acoustic resonator.

An exemplary frequency domain acoustic signal response 34 of the resonator unit 6 is shown in FIG. 5, in which the amplitude of the electrical response signal is plotted as an amplitude response 36, and the phase of the electrical response signal relative to the electrical excitation signal is plotted as the phase response 38, against increasing frequency of the electrical excitation signal. For brevity and clarity, FIG. 5 shows a single resonant frequency $f_r$, the fundamental resonant frequency, and omits the repeating pattern of resonances that occurs at the harmonics of the fundamental frequency. The amplitude response 36 and/or the phase response 38 can be used as the acoustic signal response 34 in different embodiments. A time domain acoustic signal response could equivalently be used as the acoustic signal response 34 in some embodiments.

As illustrated in FIG. 5, the acoustic signal response 34 typically shows abrupt change in both the amplitude response 36 and the phase response 38 in the vicinity of the resonant frequency $f_r$, such that even the smallest change in the frequency of the excitation signal in the resonance condition causes readily detectable changes in the acoustic signal response 34 of the acoustic resonator 18. A measure commonly used to describe frequency selectivity is the Quality factor (Q-factor). The Q-factor of the acoustic resonator 18 can readily exceed 200. This large Q-factor means that the acoustic resonator 18 is highly selective, and effectively operates as a front-end narrowband filter affording immunity to noise and enhancing measurement accuracy.

As discussed below, the pressure and/or temperature of the air can be determined from the acoustic signal response 34 of the resonator unit 6.

Broadly speaking, the barometric pressure of the air affects the amplitude response 36 of the resonator unit 6 and has virtually no impact on the resonant frequencies of the resonator unit 6. The barometric pressure of the air can be conveniently determined from the measured acoustic signal response 34 using a calibration curve or table of values that relates the amplitude of the acoustic signal at the fundamental frequency $f_r$ and/or at harmonics of the fundamental frequency $f_r$ to the barometric pressure of the air.

In more detail, the local maximum at a resonance peak, which occurs at each of the resonant peaks associated with the fundamental frequency and its harmonics, can be identified from the amplitude response 36, and the magnitude of the local maximum used to represent the amplitude of the acoustic signal at that frequency.

The calibration curve or table of values relating the amplitude of the acoustic signal at one or more resonant frequencies to the pressure, can be derived by experiment. Values in the calibration table relating the local maximum signal amplitudes at one or more of the resonant frequency and its harmonics to pressure are tentatively set to unity or any other convenient default value and saved in the program memory of the sensor. The sensor 2 is placed in an altitude chamber (variable pressure chamber), which allows the pressure to be set accurately by the operator. The pressure in the altitude chamber is gradually altered over the range of interest, and the pressure value determined by the sensor 2 using the calibration table and the true pressure indicated by the altitude chamber are recorded at a number of different pressures. The true pressure is subtracted from the pressure value indicated by the sensor to derive an error value that can be used to adjust the values in the calibration table. This process is repeated to adjust the values in the calibration table to reduce the error value below acceptable limits.

The temperature of the air affects the resonant frequencies of the resonator unit 6. The temperature of the air can be conveniently determined from a resonant frequency, typically of the low order harmonics of the fundamental resonant frequency $f_r$ or or the fundamental frequency $f_r$ itself.

In more detail, the absolute temperature of the air T, in Kelvin, can be determined, with good accuracy, from the following expression:

$$T = \{(2*D*f_r(n)/n)^2 + u_a^2\}*k$$

where

D is the distance between the reflectors 10, 12 of the acoustic resonator 18 in metres (m)

$f_r(n)$ is the frequency of the $n_{th}$ harmonic of the acoustic resonator 18 in Hertz (Hz). It is understood that $f_r(1)$ denotes the fundamental frequency, that is $f_r(1) = f_r$.

n is the harmonic index, a dimensionless integer greater than 0

$u_a$ is the air speed in a secondary direction perpendicular to the standing wave, in meters per second (m/s)

k=is a constant.

The value of k depends on the composition of the fluid being measured, and in the case of air the value is also affected by humidity.

A suitable value of k can be derived experimentally for any fluid as follows. k is tentatively set to unity or any other convenient default value and saved in the program memory of the sensor. The sensor 2 is placed in an environmental chamber (variable temperature and humidity chamber) containing the fluid, which allows the temperature and humidity to be set accurately by the operator. The temperature in the environmental chamber is gradually altered over the range of interest, and the temperature value calculated by the sensor 2 using the above expression, and the true temperature of the environment indicated by the environmental chamber, are recorded at a number of different temperatures. The true temperature is subtracted from the temperature value provided by the sensor 2 to derive an error value that can be used to adjust the value of k stored in the program memory. If the error value is positive then k is reduced by the amount necessary to reduce the error value below acceptable limits. Conversely, if the error value is negative then k is increased accordingly.

Throughout the experiment, the humidity is held constant at any desirable value.

The experiment can be repeated over different values of humidity in order to derive a table of k values that apply in different humidity environments and also for dry air. A measurement of the humidity of the air can then be used to select the correct value of k to be used. Alternatively, the sensor 2 may use only a single value of k, selected for example based on the expected humidity in the environment in which the sensor 2 will be used.

In embodiments of the invention, therefore, a measured air speed $u_a$ is used in calculating the temperature of air T. This measurement can be carried out by any sensor capable of measuring the air speed: one such device is described in European patent publication EP0801311A.

In some embodiments, the sensor 2 can be designed with a baffle or other structure that reduces the speed of air in the secondary direction, to minimise the effect of the air speed on the calculated temperature T.

For simplicity of calculation, and in order to avoid the requirement to measure the air speed, in some embodiments an estimated value for the air speed $u_a$ can be used to calculate the temperature T. In some embodiments the estimated air speed is zero. This may be appropriate, for example, where air is stationary or largely stationary such as inside a room or a closed container or where reduced accuracy can be tolerated.

The present invention makes use of the same physical phenomenon of acoustic resonance that is utilised by the flow meter disclosed in European patent publication EP0801311A. Embodiments may make use of the same arrangement of upper and lower reflectors and the same transducers as disclosed in European patent publication EP0801311A. In addition the electronic circuitry necessary to implement the disclosed sensor 2 can be implemented easily in the same instrument. Consequently, embodiments of the flow meter disclosed in European patent publication EP0801311A and the sensor 2 of the current disclosure can combine and share all the hardware in one instrument which, accordingly, measures the speed of the fluid flow and additionally the temperature and/or pressure of the fluid, at small additional cost and complexity.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present disclosure.

The invention claimed is:

1. A sensor, comprising
a resonator unit, the resonator unit comprising an acoustic resonator for containing a fluid, the acoustic resonator being operable to support standing acoustic waves, the resonator unit being operable to convert an electrical excitation signal into an acoustic signal in the acoustic resonator to establish the standing acoustic waves and operable to convert the acoustic signal in the acoustic resonator into an electrical response signal, and
an electronic unit coupled to the resonator unit, the electronic unit being operable to provide the electrical excitation signal to the resonator unit and to receive the electrical response signal from the resonator unit, to process the electrical excitation signal and the electrical response signal to determine an acoustic signal response, and to use a value for a speed of flow of the fluid through the acoustic resonator in determining a temperature of the fluid in the acoustic resonator from the acoustic signal response.

2. The sensor as claimed in claim 1, wherein the electronic unit is operable to determine a resonant frequency of the standing acoustic waves from the acoustic signal response, and to determine the temperature of the fluid from the resonant frequency.

3. The sensor as claimed in claim 2, wherein the electronic unit is operable to determine the acoustic signal response over a range of frequencies of the electrical excitation signal, and to determine the resonant frequency of the standing acoustic waves from the acoustic signal response as a frequency with the largest local amplitude response.

4. The sensor as claimed in claim 1, wherein the electronic unit is operable to measure the speed of flow of the fluid through the acoustic resonator, and to use the measured speed of flow of the fluid as the value for the speed of flow of the fluid.

5. The sensor as claimed in claim 1, wherein the acoustic resonator comprises a first reflector and a second reflector spaced apart from the first reflector, wherein the first reflector and the second reflector define boundaries of the acoustic resonator such that the acoustic resonator is operable to support the standing acoustic waves between the first reflector and the second reflector.

6. The sensor as claimed in claim 5 wherein the electronic unit is operable to determine the temperature of the fluid using a resonant frequency of the standing acoustic waves and a distance between the first reflector and the second reflector.

7. The sensor as claimed in claim 1, wherein the acoustic resonator is for containing a gas and the electronic unit is operable to determine the acoustic signal response over a range of frequencies of the electrical excitation signal and to determine a pressure of the gas from an amplitude of the acoustic signal, at one or more of a fundamental frequency and its harmonics, derived from the acoustic signal response.

8. The sensor as claimed in claim 1, wherein the resonator unit comprises one or more transducers, each transducer being operable to convert the electrical excitation signal into the acoustic signal in the acoustic resonator and/or operable to convert the acoustic signal in the acoustic resonator into the electrical response signal.

9. A method of measuring temperature of a fluid, comprising
applying an electrical excitation signal to at least one transducer operable to convert the electrical excitation signal into an acoustic signal in an acoustic resonator for containing a fluid, to establish standing acoustic waves in the acoustic resonator;
receiving an electrical response signal from at least one transducer operable to convert the acoustic signal in the acoustic resonator into an electrical response signal;
processing the electrical excitation signal and the electrical response signal to determine an acoustic signal response; and
using a value for a speed of flow of the fluid through the acoustic resonator in determining a temperature of the fluid in the acoustic resonator from the acoustic signal response.

10. A sensor, comprising
a resonator unit, the resonator unit comprising an acoustic resonator for containing a fluid, the acoustic resonator being operable to support standing acoustic waves, the resonator unit being operable to convert an electrical excitation signal into an acoustic signal in the acoustic resonator to establish the standing acoustic waves and operable to convert the acoustic signal in the acoustic resonator into an electrical response signal; and
an electronic unit coupled to provide the electrical excitation signal to the resonator unit and to receive the electrical response signal from the resonator unit, the electronic unit comprising a processor and a memory containing instructions executable by the processor to:
process the electrical excitation signal and the electrical response signal to determine an acoustic signal response, and
use a value for a speed of flow of the fluid through the acoustic resonator in determining one or more of a pressure and a temperature of the fluid in the acoustic resonator from the acoustic signal response.

* * * * *